D. KLEIN.
MILKING MACHINE.
APPLICATION FILED DEC. 5, 1907.
1,024,859.
Patented Apr. 30, 1912.
3 SHEETS—SHEET 2.
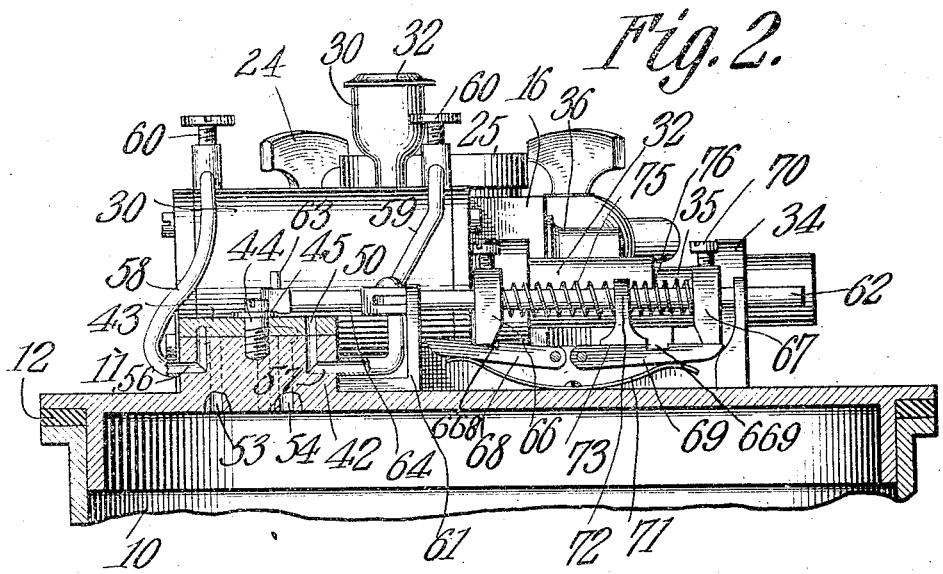
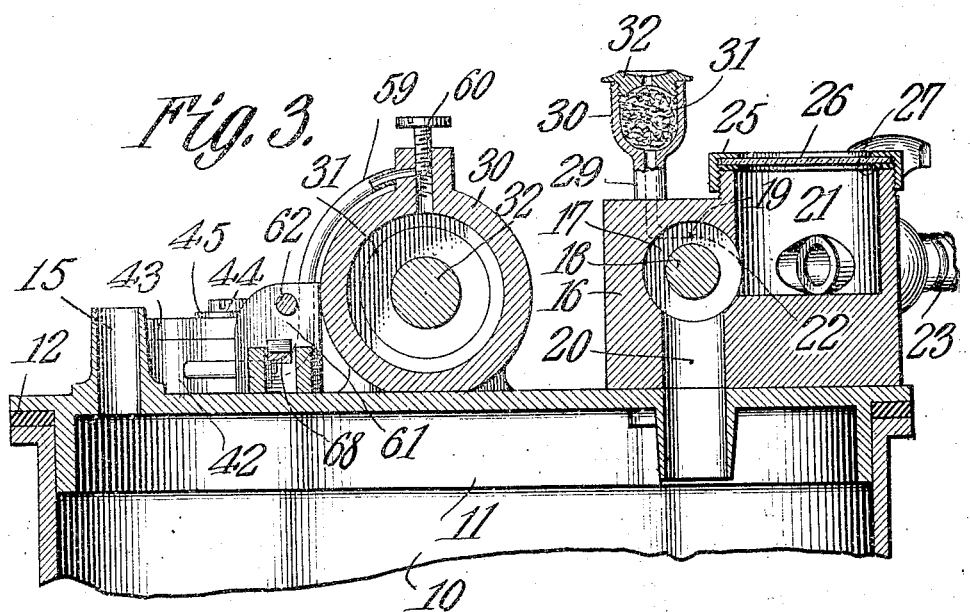
Witnesses
Inventor
Daniel Klein.
By Wilhelm, Parker & Hard
Attorneys

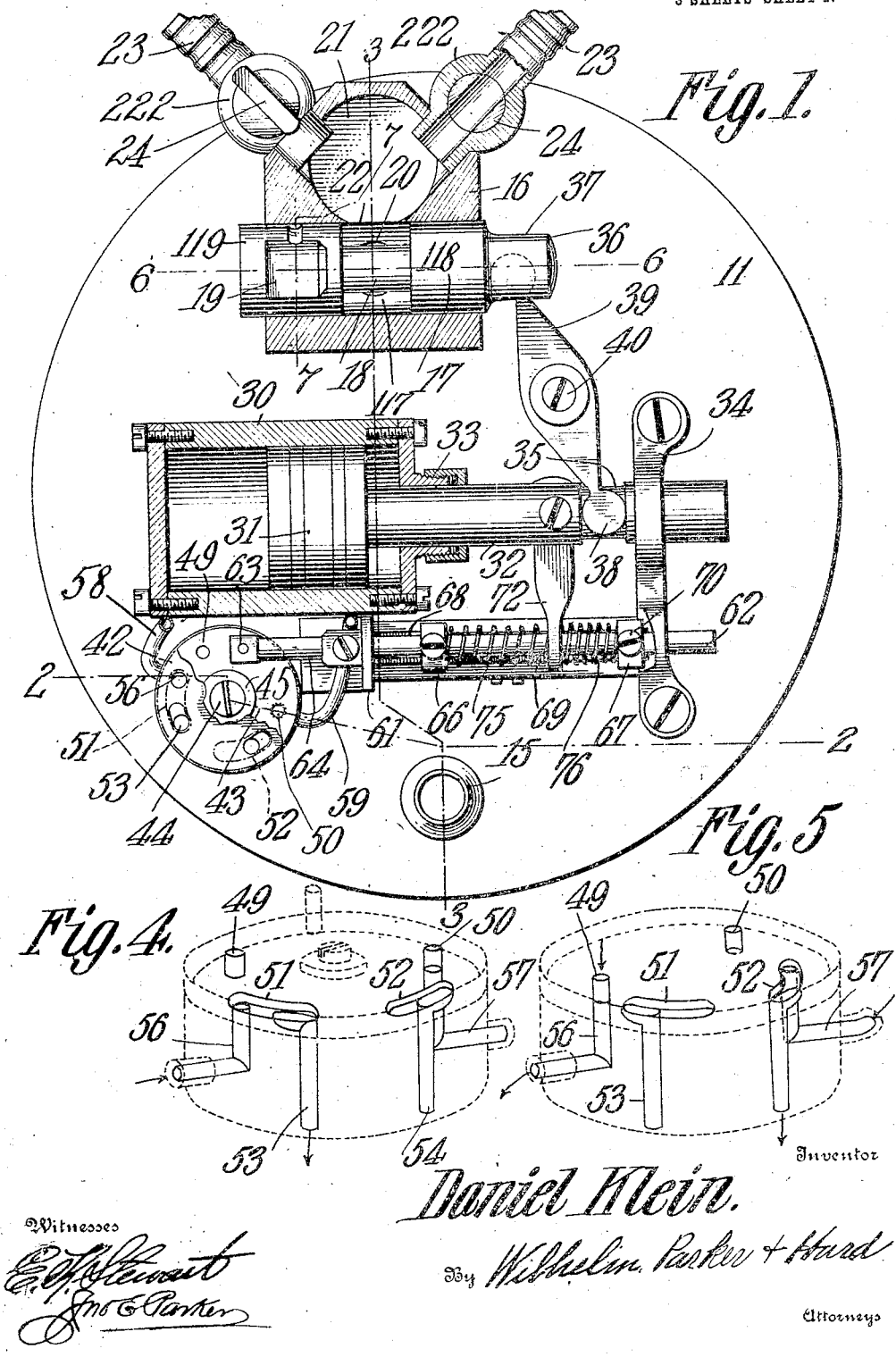

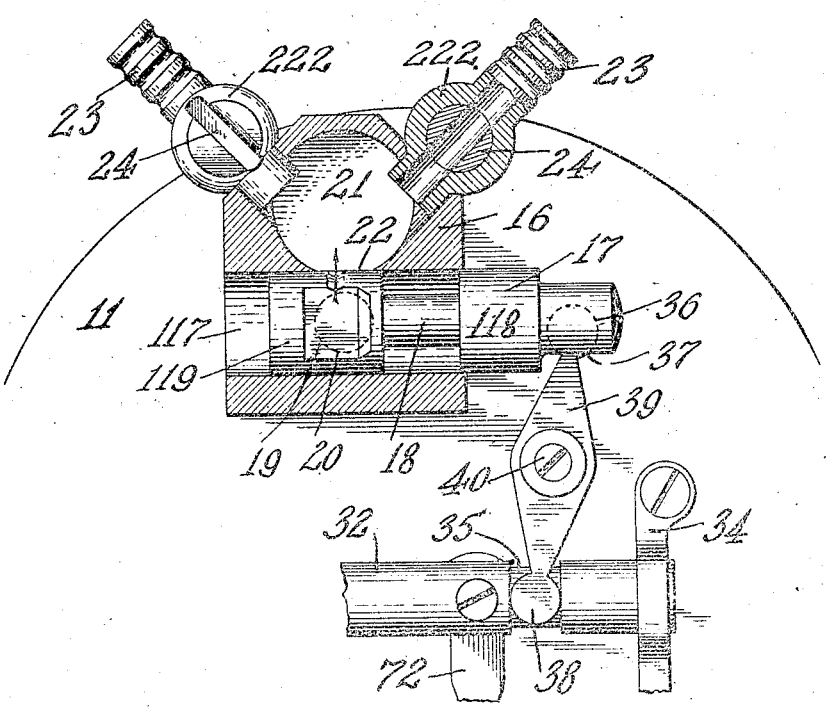

UNITED STATES PATENT OFFICE.

DANIEL KLEIN, OF SPOKANE, WASHINGTON, ASSIGNOR TO D. H. BURRELL & CO., OF LITTLE FALLS, NEW YORK.

MILKING-MACHINE.

1,024,859.  Specification of Letters Patent.  Patented Apr. 30, 1912.

Application filed December 5, 1907. Serial No. 405,161.

*To all whom it may concern:*

Be it known that I, DANIEL KLEIN, a citizen of the United States, residing at Spokane, in the county of Spokane and State of Washington, have invented a new and useful Improvement in Milking-Machines, of which the following is a specification.

This invention relates to that class of milking machines in which suction is applied to the teat cups intermittently or in pulsations by means of a pulsator mechanism which alternately applies the suction to the teat cups and disconnects the suction therefrom.

The invention relates more particularly to pulsator mechanisms which are actuated automatically by pneumatic means, and is applicable, for instance, to pulsators which are actuated by the suction itself, or by suction in connection with air pressure, or by air pressure alone.

The object of this invention is to provide a pulsator mechanism of this general character which is simple and durable in construction, reliable in operation, which can be easily cleaned, and which can be nicely adjusted to produce the desired automatic action.

In the accompanying drawings: Figure 1 is a sectional plan view of a pulsator mechanism constructed in accordance with the invention, the pulsator valve being shown in the suction position. Fig. 2 is a sectional elevation through the valve mechanism and the top of the milk pail, in line 2—2, Fig. 1. Fig. 3 is a transverse sectional view in line 3—3, Fig. 1. Fig. 4 is a perspective diagram showing the reversing valve in position for a stroke in one direction. Fig. 5 is a similar view showing the parts in position for a stroke in the opposite direction. Fig. 6 is a vertical longitudinal section through the pulsator valve in line 6—6, Fig. 1. Fig. 7 is a vertical cross section through the pulsator valve in line 7—7, Fig. 1. Fig. 8 is a horizontal longitudinal section through the pulsator valve in the relief position.

Similar reference numerals indicate corresponding parts in the several figures.

The apparatus shown in the drawings is one of the class in which the pulsator is mounted on the milk pail or receptacle, the milk pail being connected by a suction pipe to a vacuum tank or other exhaust apparatus located at a suitable point in the barn and the milk pail being connected to the teat cups by means of milk tubes.

In the drawings 10 represents the milk pail and 11 the cover thereof, packed by a ring 12. The cover is provided with a nipple 15 to which the main suction pipe is connected for the purpose of maintaining a constant vacuum or suction within the milk pail.

On top of the pail is mounted a casing 16 which is provided with a transverse bore or cylinder 117 for the reception of the pulsator valve 17, which, as shown, is a piston valve having a centrally reduced portion 18, heads 118 and 119 on opposite sides thereof, and an air port 19 which is formed by flattening a portion of the head 119. The bore or cylinder 117 communicates with the milk pail through a vertical passage 20, and with an inspection chamber 21 through a lateral port 22. From this inspection chamber lead nipples 222, to which the milk tubes 23 are connected, and the nipples may be provided with stop cocks 24 for cutting off one or more of the tubes in accordance with the number to be employed. The upper portion of the inspection chamber 21 is provided with a collar 25 which holds a transparent disk 26 in place, packed by a ring 27. The flow of milk through the chamber 21 may thus be observed at all times.

29 is an air inlet port which opens into the valve cylinder 117 adjacent to the valve head 119. This port may be provided with a casing 30 containing a filtering material 31, held in place by a perforated cap 32. The filter will act to strain the air and if necessary may be saturated with a suitable antiseptic solution.

In the suction position of the pulsator valve, shown in Figs. 1, 3, 6 and 7, the interior of the milk pail communicates with the milk tubes 23 by the passage 20, the cylinder bore 117, port 22, inspection chamber 21 and the nipples 222, and the suction or partial vacuum existing in the milk pail is so applied to the teat cups. The milk withdrawn from the animal by the suction flows down through these passages into the pail. In this position of the pulsator valve the air inlet port 29 is out of communication with the inspection chamber and teat cups. When the pulsator valve is moved to the relief position, shown in Fig. 8, the port 20 is closed by the valve, thus disconnecting the suction from the teat cups, and the port 19 of the valve places the air inlet port 29 of the casing in communication with the port 22, so that atmospheric air may flow through the inspection chamber and into the milk tubes and teat cups, thus relieving the vacuum therein. The extent to which the air pressure is so increased depends on the length of time the air port is open, but the vacuum is never broken to such an extent that the teat cups will fall from the teats. The pulsator valve is then returned to the suction position and communication reëstablished between the milk pail and the milk tubes and suction again applied to the cups.

The pulsator valve is actuated or reciprocated by a pneumatic motor or engine of any suitable construction, that shown in the drawings comprising a double-acting actuating cylinder and piston, a reversing valve by which the suction is alternately applied to opposite ends of the cylinder, and an escapement or reversing mechanism by which the reversing valve is shifted or reversed from the piston when the latter has about reached the end of its stroke.

30 represents the horizontal actuating cylinder which is mounted on the cover 11 and in which is arranged the actuating piston 31.

32 represents the piston rod which passes through a stuffing box 33 and is guided in a bearing formed in a standard 34 secured to the cover of the pail. The outer portion of the piston rod is provided with a transverse groove 35, and the pulsator valve is provided with a stem 36 having a corresponding groove 37. Into these two grooves fit the ends 38 of a lever 39 which is pivoted on a stud 40 carried by the cover, so that movement will be transmitted by this lever from the piston rod 32 to the pulsator valve.

42 represents a cylindrical valve block secured to or formed integral with the cover of the pail and having its top faced to form a flat seat for the reversing valve 43. The valve 43, which is shown as a disk valve, rocks on a screw 44 which extends into the block 42 and has a flange 45 which bears against the top of the valve and holds the latter down to its seat. The reversing valve is provided with two air inlet ports 49 and 50 which extend through the valve, and in its lower face with two cavities 51 and 52.

53 and 54 are two suction ports which extend through the block 42 and communicate with the interior of the milk pail. These ports terminate at the valve seat and are under the control of the cavities 51 and 52. The block is further provided with two ports 56 and 57 which communicate with pipes 58 and 59, respectively, leading to the opposite ends of the cylinder 30. Communication between the pipes 58 and 59 and the cylinder is under the control of valves 60 which may be adjusted to control the working area of the cylinder ports.

The escapement or reversing mechanism is constructed as follows: The standard 34 and the auxiliary standard 61 are provided with bearings for the reception of a valve rod 62 which is connected to a pin 63 on the valve disk by means of a link 64. To the rod are secured two tappet blocks 66 and 67, the lower edges of which are engaged by pivoted locking arms 68 and 69, the arms being provided with recesses 668 and 669, respectively, into which the tappet blocks may enter. The blocks are adjustably secured to the rod by screws 70. The locking arms are at all times pressed upward by the arms of a leaf spring 71, so that they always tend to engage with the tappet blocks.

72 is an arm extending laterally from the piston rod 32 and provided with an opening for the passage of the valve rod 62. This arm has a projection 73 which engages the locking arms 68 69 and tends to release the latter from the tappet blocks. Between the opposite sides of the arm and the tappet blocks are compression springs 75 76 which are coiled around the valve stem 62 and are compressed alternately as the arm 72 reciprocates with the piston rod. In the operation of this portion of the mechanism, the parts being in the position indicated in Figs. 1, 2 and 4, the suction port 53 in the seat of the reversing valve is in communication with the left hand end of the cylinder 30 through the valve cavity 51, seat port 56 and pipe 58, while the right hand end of the cylinder is in communication with the outer air through the air inlet port 50, seat port 57 and pipe 59. As a result of this, the suction is applied to the left hand end of the cylinder and the pressure of the external air to the right hand end and the piston 31 will be forced to move to the left. In this position of the parts the tappet block 66, Fig. 2, is locked by its locking arm 68, the tappet block 67 rests loosely upon its locking arm 69, and the releasing shoe 73 depresses the arm 69 and holds the same in the releasing position. During the movement of the piston toward the left in Figs. 1 and 2, the arm 72 will be carried to the left and the shoe 73 of the arm will move from engagement with the locking arm 69 into engagement with the locking arm 68, meantime compressing the spring 75. Toward the latter part of this movement the arm 68 will be moved downward by the shoe 73, releasing the tappet block 66, and the spring 75 being then under compression will expand and move the valve stem 62 to the left, thereby shifting the valve disk to the position shown in Fig. 5, and thereupon the left hand end of the cylinder will be placed in communication with the outer air, while the right hand end will be placed in communication with the milk pail so that the operation will be reversed. This reciprocating movement of the actuating piston is transmitted through the lever 39 to the pulsator valve and results in the operation of the pulsator as previously described.

The milk flows only through the passages which are controlled by the pulsator valve and the actuating mechanism of this valve is entirely separate from the pulsator valve and not affected by the milk or the milk by this actuating mechanism. In order to clean the valve mechanism and connecting milk passages, it is therefore only necessary to clean the pulsator valve and connecting parts, which is readily done upon disconnecting the lever 39 from the valve and removing the latter from its cylinder.

It is obvious that the mechanical features of the pulsator valve and its pneumatic actuating mechanism may be modified in many respects without departing from the spirit of the invention, the construction shown being intended only to represent the best mode known to me of carrying the invention into practice.

I claim as my invention:

1. In a milking machine, the combination of a pulsator valve which is exposed at both ends to the same pressure and which applies suction intermittently, and a double-acting pneumatic motor separate from said valve and connected therewith for actuating the same, substantially as set forth.

2. In a milking machine, the combination of a pulsator valve which is exposed at both ends to the same pressure, and a double-acting pneumatic motor separate from said valve and comprising an actuating cylinder and piston, a reversing valve and an escapement mechanism connecting said piston with said reversing valve, substantially as set forth.

3. In a milking machine, the combination of a pulsator piston valve, an open-ended cylinder therefor in which said valve is exposed at both ends to the same pressure, a pneumatic motor independent of said valve, and means for connecting said valve with said motor, substantially as set forth.

4. The combination of a milk pail, a cover therefor, an open-ended valve cylinder arranged on the cover and having both ends exposed to the atmosphere, said cylinder being provided with a suction port connecting said cylinder with the pail and with an air inlet port, an inspection chamber communicating with said cylinder and having a plurality of connections for individual teat-cup tubes, and a pulsator valve arranged in said cylinder and comprising heads which fit in the same and a reduced connecting portion forming a chamber for placing the inspection chamber in communication with the outer air, one of said heads having an air inlet port for placing the inspection chamber in communication with said air inlet port of the cylinder, substantially as set forth.

5. In a milking machine, the combination of a pulsator valve, a pneumatically actuated piston and rod for operating the same, a cylinder in which said piston is arranged, a reversing valve for controlling the flow of the actuating fluid to the cylinder, a valve rod provided with tappets, locking arms engaging said tappets, a releasing device for said arms, and reversing springs acting on said valve rod, substantially as set forth.

6. In a milking machine, the combination of a pulsator valve, a pneumatically actuated piston and rod for operating the same, a cylinder in which said piston is arranged, a reversing valve for controlling the flow of the actuating fluid to the cylinder, a valve rod provided with tappets, locking arms engaging said tappets, a releasing shoe secured to said piston rod and alternately engaging said locking arms, and reversing springs interposed between said shoe and tappets and acting on said valve rod, substantially as set forth.

Witness my hand in the presence of two subscribing witnesses.

DANIEL KLEIN.

Witnesses:
A. C. WELD,
C. W. GOLDEN.